United States Patent
Eiselt

(10) Patent No.: US 8,670,673 B2
(45) Date of Patent: Mar. 11, 2014

(54) METHOD OF OPERATING AN OPTICAL TRANSMISSION SYSTEM, OPTICAL TRANSMITTER, AND OPTICAL RECEIVER

(75) Inventor: Michael Eiselt, Kirchheim (DE)

(73) Assignee: ADVA AG Optical Networking (DE)

( * ) Notice: Subject to any disclaimer, the term of this patent is extended or adjusted under 35 U.S.C. 154(b) by 497 days.

(21) Appl. No.: 12/943,361

(22) Filed: Nov. 10, 2010

(65) Prior Publication Data

US 2011/0110659 A1    May 12, 2011

(30) Foreign Application Priority Data

Nov. 12, 2009   (EP) .................................... 09014144

(51) Int. Cl.
    *H04B 10/07*    (2013.01)
(52) U.S. Cl.
    USPC ................. 398/170; 398/22; 398/23; 398/24; 398/169
(58) Field of Classification Search
    USPC ..................... 398/16, 25, 28, 31, 34, 169, 170
    See application file for complete search history.

(56) References Cited

U.S. PATENT DOCUMENTS

| 5,909,297 | A  | * | 6/1999  | Ishikawa et al. .............. 398/198 |
| 5,963,312 | A  | * | 10/1999 | Roberts ......................... 356/73.1 |
| 6,269,204 | B1 | * | 7/2001  | Ishikawa ........................ 385/24 |
| 6,865,348 | B2 | * | 3/2005  | Miyamoto et al. ............ 398/183 |
| 7,630,641 | B1 | * | 12/2009 | Uhlhorn ........................ 398/77 |
| 8,249,454 | B2 | * | 8/2012  | Sugawara et al. ............. 398/72 |
| 2003/0007142 | A1 | * | 1/2003 | Hotate et al. .................. 356/73.1 |
| 2003/0210387 | A1 | * | 11/2003 | Saunders et al. ............... 356/73 |
| 2004/0208523 | A1 | * | 10/2004 | Carrick et al. .................. 398/32 |
| 2005/0084197 | A1 | * | 4/2005  | Kwon et al. ...................... 385/8 |
| 2005/0196174 | A1 | * | 9/2005  | Evangelides et al. ......... 398/151 |
| 2006/0007426 | A1 |   | 1/2006  | Weller |
| 2006/0110161 | A1 | * | 5/2006  | Cho et al. ........................ 398/72 |
| 2006/0182405 | A1 | * | 8/2006  | Dorward ....................... 385/134 |
| 2007/0116467 | A1 | * | 5/2007  | Kwon et al. .................... 398/72 |
| 2008/0131114 | A1 |   | 6/2008  | Jang et al. |
| 2008/0165348 | A1 | * | 7/2008  | Kim et al. .................... 356/73.1 |

(Continued)

FOREIGN PATENT DOCUMENTS

| WO | 9302344 A1 | 2/1993 |
| WO | 2010022787 A1 | 3/2010 |

OTHER PUBLICATIONS

Wavelength Division Multiplexing (WDM). (1998). In Dictionary of Communications Technology: Terms, Definitions and Abbreviations, Wiley. Retrieved from http://www.credoreference.com/entry/wileycommtech/wavelength_division_multiplexing_wdm.*

(Continued)

*Primary Examiner* — David Payne
*Assistant Examiner* — Tanya Motsinger
(74) *Attorney, Agent, or Firm* — Donald R. Boys; Central Coast Patent Agency, Inc.

(57) ABSTRACT

The invention relates to a method of operating an optical transmission system (100a, 100b, 100c), wherein at least one optical data signal is transmitted over an optical transmission link (120), which particularly comprises at least one optical fiber (120a).

Figure 1A:
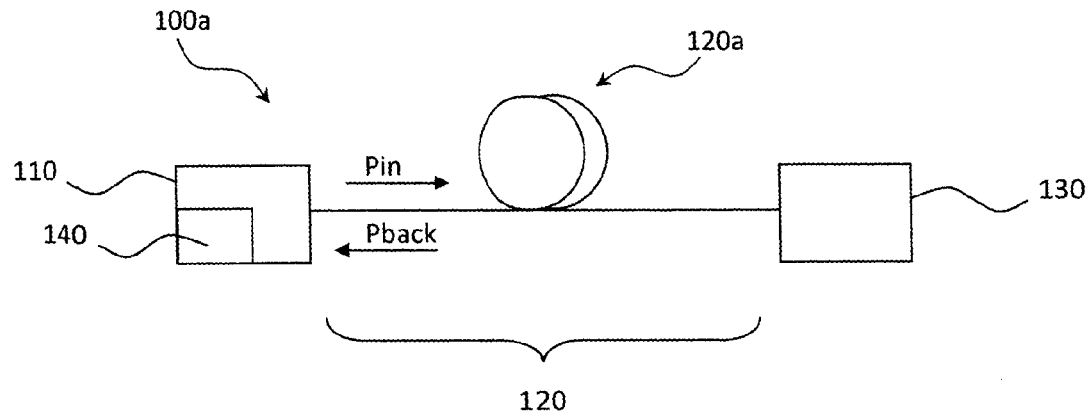

The inventive method is characterized by modulating (200) said data signal with a test signal (s) having a predetermined modulation frequency $f_{mod}$ to obtain a modulated data signal (Pin), by receiving (210) a reflected portion (Pback) of said modulated data signal (Pin), and by determining (220) a fiber quality measure (a) depending on said received reflected portion (Pback) of said modulated signal (Pin).

15 Claims, 3 Drawing Sheets

(56) References Cited

U.S. PATENT DOCUMENTS

| | | | |
|---|---|---|---|
| 2008/0309925 A1* | 12/2008 | Abbott | 356/73.1 |
| 2009/0047013 A1* | 2/2009 | Effenberger | 398/16 |
| 2009/0257743 A1* | 10/2009 | Chung et al. | 398/21 |
| 2009/0263122 A1* | 10/2009 | Helkey et al. | 398/7 |
| 2011/0274426 A1* | 11/2011 | Yang | 398/16 |
| 2012/0027402 A1* | 2/2012 | Effenberger | 398/13 |

OTHER PUBLICATIONS

Pierce S G et al., Optical Frequency-Domain Reflectometry for Microbend Sensor Demodulation, Applied Optics, Optical Society of America, US LNKD-DOI: 10.1364/AO.39.004569, vol. 39, No. 25, Sep. 1, 2000, pp. 4569-4581, XP002493524, ISSN: 0003-6935.

* cited by examiner

US 8,670,673 B2

METHOD OF OPERATING AN OPTICAL TRANSMISSION SYSTEM, OPTICAL TRANSMITTER, AND OPTICAL RECEIVER

The present application claims priority to EP application 09014144.1, filed Nov. 12, 2009, which is incorporated herein in its entirety, at least by reference.

FIELD OF THE INVENTION

The present invention relates to a method of operating an optical transmission system, wherein at least one optical data signal is transmitted over an optical transmission link, which particularly comprises at least one optical fiber.

The present invention further relates to an optical transmitter, an optical receiver and an optical transmission system.

BACKGROUND

It is already known to apply optical time-domain reflectometry, OTDR, to determine the quality of an optical transmission link. The OTDR principle requires an optical pulse to be transmitted over the fiber under test, and a resulting reflected signal is measured in a time-resolved way.

Similarly, optical frequency-domain reflectometry, OFDR, is already known, too.

Disadvantageously, both OTDR and OFDR techniques require to use a transmission pulse having a comparatively high optical power, which especially in the context of wavelength division multiplex, WDM, systems results in the blocking of at least one wavelength channel for transmission of user data. In optical access systems based on a WDM PON (passive optical network) configuration, each customer fiber can only be accessed via one particular wavelength. Thus, the application of conventional OTDR and OFDR techniques interrupts or at least impedes a regular data transmission over an optical transmission link, especially in WDM PON structures. Moreover, OFDR techniques necessitate rather complex measurement setups to measure an optical phase of a reflected signal with sufficient precision.

SUMMARY

Accordingly, it is an object of the present invention to provide an improved method of operating an optical transmission system, an improved optical transmitter and an improved optical receiver which particularly offer an efficient assessment of the quality of optical transmission links.

According to the present invention, regarding the abovementioned method, this object is achieved by modulating said data signal with a test signal having a predetermined modulation frequency $f_{mod}$ to obtain a modulated data signal, by receiving a reflected portion of said modulated data signal, and by determining a fiber quality measure depending on said received reflected portion of said modulated signal.

The inventive method advantageously requires a less complex hardware setup as compared to conventional OTDR and OFDR systems because a regular optical data signal carrying user traffic is employed for performing the inventive method. Moreover, performing the inventive method does not require any interruption of a regular operation of the optical transmission system, because it is the regular optical data signal which is modulated for test purposes according to the principle of the present invention.

The inventive method advantageously enables to efficiently monitor physical properties such as loss and/or reflection parameters of a fiber plant or a single optical transmission link while the respective optical transmission systems remain fully operative.

By employing the inventive method, any upcoming problems related to an optical transmission system which effect an alteration of scattering and/or reflection behavior can be detected at a very early stage so that appropriate countermeasures can be taken.

While the invention may preferably be used for assessing the link quality of optical access networks such as WDM PONS, any other optical transmission link may be analyzed according to the inventive principle, too.

According to a preferred embodiment, said step of modulating is performed by altering an input signal of an optical transmitter, which may e.g. be a wavelength division multiplex, WDM, transmitter. The transmitter's input signal is altered depending on said test signal, whereby e.g. a modulation current may be influenced that is used in said transmitter to control an optical output power of a laser light source such as a semiconductor laser diode.

According to a further preferred embodiment, said step of modulating is performed by using an external modulator, which advantageously enables to implement the invention with existing systems that do not offer direct access to a transmitter, e.g. for modifying a modulation current of a laser light source.

According to a further preferred embodiment, a plurality of different optical data signals of a wavelength division multiplex, WDM, system are, preferably simultaneously, modulated by respective test signals, which enables to simultaneously analyze the optical properties of a plurality of optical WDM channels or even optical transmission links in general.

According to a further embodiment of the present invention, particularly precise information on the optical transmission link under test may advantageously be gathered by repeating said steps of modulating and receiving for M many different modulation frequencies $f_{mod}(m), m=1, \ldots, M$. I.e., the inventive determination of the fiber quality measure is performed several times, wherein a different modulation frequency for the test signal is chosen each time.

According to a further preferred embodiment of the present invention, for said step of determining said fiber quality measure, a frequency component of said received reflected portion of said modulated signal is determined which corresponds to said predetermined modulation frequency $f_{mod}(m)$. This enables to easily separate those signal portions of the received reflected portion, which comprise information on said optical transmission link, from other signal portions which e.g. comprise user data of the modulated data signal that is not required for the inventive assessment of the link quality.

In this context, it is particularly preferred to determine a scattering term $H(f_{mod})$, which can be derived from said frequency component of said received reflected portion.

According to another very advantageous embodiment of the present invention, scattering terms $H(f_{mod}(m))$ are determined for M many different modulation frequencies $f_{mod}(m)$, $m=1, \ldots, M$, wherein each scattering term $H(f_{mod}(m))$ characterizes an amplitude and phase of said reflected portion at a specific modulation frequency $f_{mod}(m)$, each scattering term $H(f_{mod}(m))$ associated with a specific modulation frequency $f_{mod}(m)$ is multiplied with a phase term denoting a phase shift which depends on said modulation frequency $f_{mod}(m)$ and a specific position x0 on said optical transmission link, whereby for each modulation frequency $f_{mod}(m)$ a phase-shifted scattering term $Hp(f_{mod}(m))$ is obtained, a sum of all M many phase-shifted scattering terms $Hp(f_{mod}(m))$ is determined, and the value for said quality measure at said specific position is determined depending on said sum, preferably by dividing said sum by said number M of different modulation frequencies $f_{mod}(m)$.

This inventive embodiment enables an efficient determination of said quality measure regarding specific positions of said transmission link under test while at the same time only requiring comparatively few processing resources as compared to conventional OFDR techniques.

According to another very advantageous embodiment of the present invention, each scattering term $H(f_{mod}(m))$ is obtained depending on the equation $$H(f_{mod}) = \int_0^L a(x) \cdot \exp\left[-j\left(\frac{4\pi f_{mod}(m)}{v}x\right)\right] dx,$$

wherein $f_{mod}(m)$ denotes said specific modulation frequency, dx denotes a differential length element of a specific position x on said optical transmission link (120), L denotes a total length of said optical transmission link to be analyzed, a(x) denotes a spatial reflection function which characterizes reflection effects and/or scattering effects and/or losses of said optical transmission link associated with said specific position x, exp [•] denotes the exponential function, j denotes the imaginary unit, and v denotes the speed of light within said optical transmission link, each phase term is obtained depending on the equation $$pt(m) = \exp\left[j\left(\frac{4\pi f_{mod}(m)}{v}x0\right)\right]$$

each phase-shifted scattering term $Hp(f_{mod})$ is obtained depending on the equation $$Hp(f_{mod}) = H(f_{mod}) \cdot pt(m)$$
$$= \int_0^L a(x) \cdot \exp\left[-j\left(\frac{4\pi f_{mod}(m)}{v}x\right)\right] dx \cdot \exp\left[j\left(\frac{4\pi f_{mod}(m)}{v}x0\right)\right].$$

According to a further preferred embodiment of the present invention, which enables a particularly efficient determination of said quality measure, a total length L of said optical transmission link to be analyzed is discretized into N many discrete length sections each of which has the length $\delta L$, and said phase term pt(m) is discretized so as to obtain a discretized phase term ptd(m) which depends on a specific position $n \cdot \delta L$ corresponding to one of said discrete length sections, wherein said discretized phase term ptd(m) is preferably obtained depending on the equation $$ptd(m, n \cdot \delta L) = \exp\left[j\left(\frac{4\pi f_{mod}(m)}{v} n \cdot \delta L\right)\right].$$

According to a further preferred embodiment, a value a(n), $n=1, \ldots 1_{max}$ for said quality measure is determined for all N many discrete length sections to provide detailed information on an overall state of the examined optical transmission link.

In order to identify specific parts of the examined optical transmission link which exhibit a comparatively large scattering and or reflecting behaviour, a further embodiment of the present invention proposes to determine a location $n_{max}$ of a length section which is associated with a maximum quality measure value $a_{max}(n_{max})$ that has the largest absolute value of said N many values $a(n), n=1, \ldots, N$ of said quality measure.

A further preferred embodiment of the present invention comprises the steps of: modifying all M many scattering terms $H(f_{mod}(m))$ depending on said maximum quality measure value $a_{max}$ to obtain respective modified scattering terms $H'(f_{mod})$, wherein said modifying is preferably performed by subtracting from a scattering term $H(f_{mod}(m))$ a product of an absolute value $abs(a_{max})$ of said maximum quality measure value $a_{max}$ and an associated phase term which characterizes a phase shift that is associated with said location $n_{max}$ of said length section which is associated with said maximum quality measure value $a_{max}$, wherein said modifying is particularly performed depending on the equation $$H'(f_{mod}(m)) = H(f_{mod}(m)) - abs(a_{max}) \cdot \exp\left[-j\left(\frac{4\pi f_{mod}(m)}{v} n_{max} \cdot \delta L\right)\right],$$

determining modified values a'(n) for all N many discrete length sections except said length section which is associated with said maximum quality measure value $a_{max}(n_{max})$ by repeating said steps of multiplying, determining the sum and determining the value for said quality measure based on said modified scattering terms $H'(f_{mod})$.

This variant of the inventive method advantageously enables to reduce an influence of highly localized scattering and/or reflection effects by providing the modified scattering terms which, after a first iteration of the inventive method, do not comprise any contribution of the currently determined maximum quality measure value. Consequently, smaller scattering and/or reflection contributions of other portions of the analyzed transmission link can also be examined in detail.

According to a further advantageous embodiment of the present invention, the step of determining modified values a'(n) is recursively repeated, preferably for N many times, wherein N corresponds to the overall number of discrete length sections of the optical transmission link to be analyzed.

According to yet another advantageous embodiment of the present invention, a frequency spacing $\delta f$ for adjacent modulation frequencies $f_{mod}(m=1), f_{mod}(m=2), \ldots$ is chosen which is proportional to a reciprocal value of the number M of different modulation frequencies and/or the length $\delta L$ of the N many discrete length sections, wherein said frequency spacing $\delta f$ is particularly obtained depending on the equation $$\delta f = \frac{p \cdot v}{2M \cdot \delta L},$$

wherein P is an integer.

As a further solution to the object of the present invention, an optical transmitter is proposed which is configured to transmit at least one optical data signal over an optical transmission link, which particularly comprises at least one optical fiber. The inventive optical transmitter is configured to modulate said data signal with a test signal having a predetermined modulation frequency $f_{mod}$ to obtain a modulated data signal for transmission over said optical transmission link. For the realization of the inventive principle, the inventive transmitter may comprise external modulator means which modulated said optical data signal that is already carrying user data.

Alternatively, it is also possible to add said inventive test signal to a modulation signal of a conventional optical transmitter to obtain the inventive configuration. Hence, in this configuration, an optical carrier signal is simultaneously modulated by both user data and the inventive test signal for measurement purposes, whereas when using an external modulator, the inventive modulation with the test signal is applied to an optical carrier signal that has already been modulated by user data before.

To enable an efficient diagnosis of optical transmission links for WDM systems having a plurality of wavelength channels, it is also possible for the inventive optical transmitter to be configured to simultaneously modulate a plurality of optical data signals, which are preferably associated with said different WDM channels. In this case, the respective test signals for the different WDM channels can either have identical or different predetermined modulation frequencies or test patterns defining a sequence of different modulation frequencies to be applied.

As a further solution to the object of the present invention, an optical receiver is proposed. The inventive optical receiver is configured to receive a reflected portion of a modulated data signal that has been transmitted over an optical transmission link, which particularly comprises at least one optical fiber, wherein said optical receiver is further configured to determine a fiber quality measure depending on said received reflected portion of said modulated signal.

The inventive optical receiver may advantageously be integrated into an inventive optical transmitter or a conventional optical transmitter having an external modulator for applying the inventive test signals to optical data signals. The inventive optical receiver can also be provided as a separate unit as long as it is connected to the fiber under test in a way which guarantees that a reflected portion of a modulated data signal can reach the optical receiver.

According to a further advantageous embodiment of the present invention, the optical receiver is configured to receive a plurality of reflected portions of modulated data signals each of which has been modulated with one of M many different modulation frequencies $f_{mod}(m), m=1, \ldots, M$, to determine a scattering term $H(f_{mod}(m))$ for each of said M many different modulation frequencies, wherein each scattering term $H(f_{mod}(m))$ characterizes an amplitude and phase of said reflected portion (Pback) at a specific modulation frequency $f_{mod}(m)$, to multiply each scattering term $H(f_{mod}(m))$ associated with a specific modulation frequency $f_{mod}(m)$ with a phase term (pt (m)) denoting a phase shift which depends on said modulation frequency $f_{mod}(m)$ and a specific position x0 on said optical transmission link, whereby for each modulation frequency $f_{mod}(m)$ a phase-shifted scattering term $Hp(f_{mod})$ is obtained, to determine a sum of all M many phase-shifted scattering terms $Hp(f_{mod})$, and to determine the value for said quality measure at said specific position depending on said sum, preferably by dividing said sum by said number M of different modulation frequencies.

Generally, according to further embodiments of the inventive optical receiver, said optical receiver is configured to perform any method steps of the method according to the present invention, particularly the method steps according to at least one of the claims 6 to 14.

A further solution to the object of the present invention is given by an optical transmission system comprising an optical transmission link, which particularly comprises at least one optical fiber, an optical transmitter, and an optical receiver.

Figure 1B:
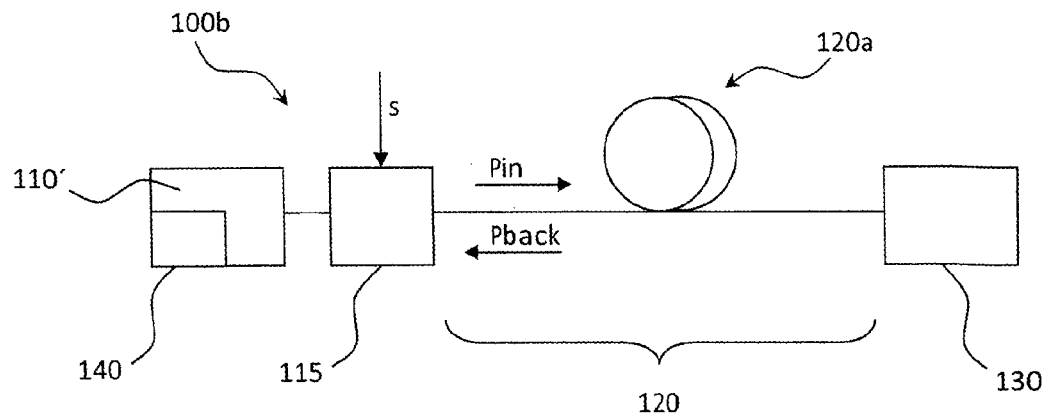
Figure 1C:
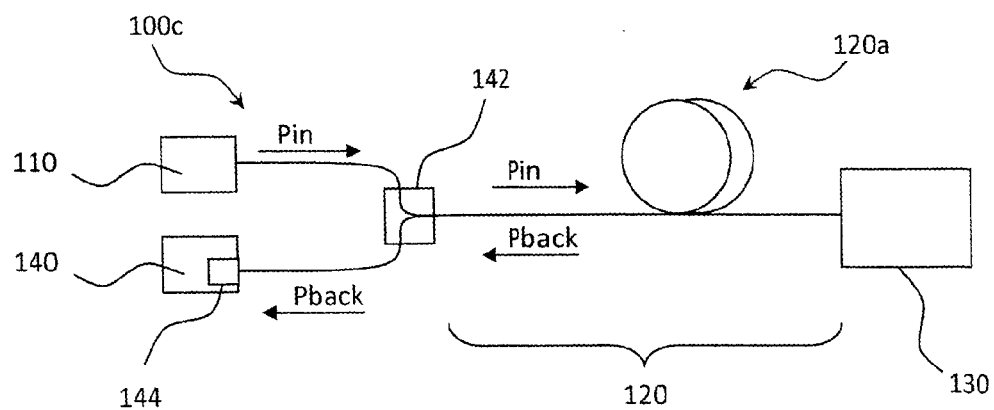
Figure 2:
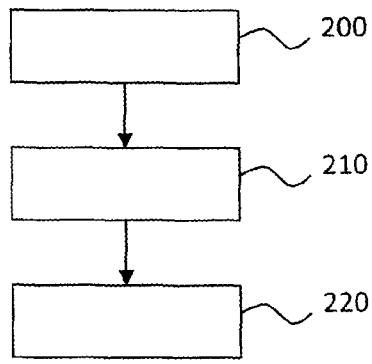
Figure 3:
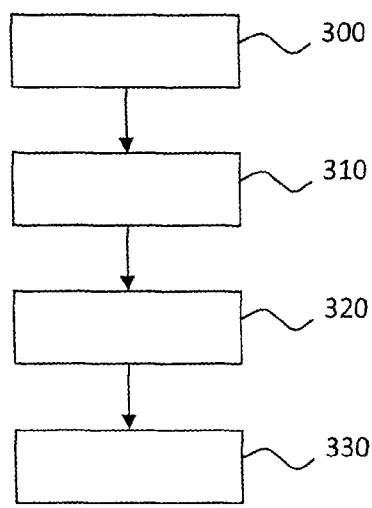
Figure 4:
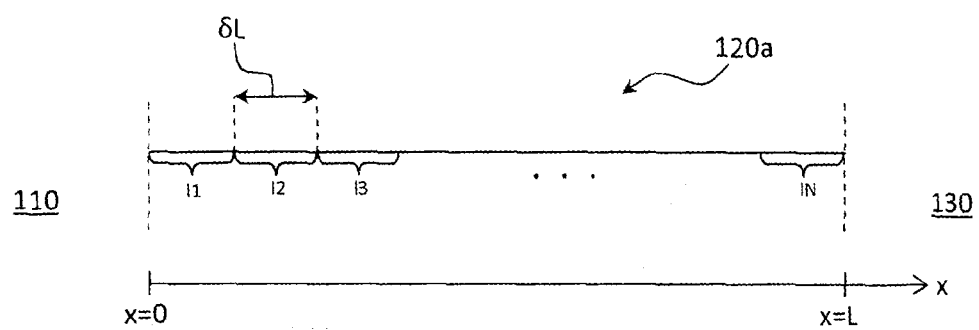
Figure 5:
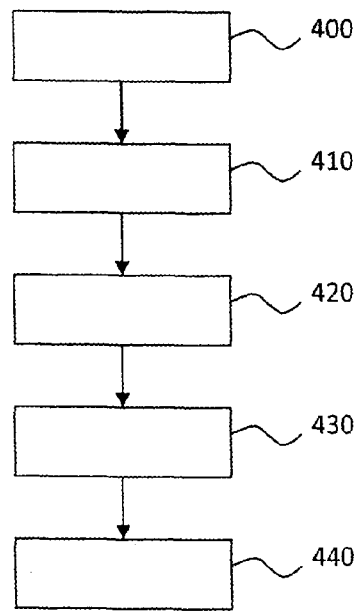
Figure 6:
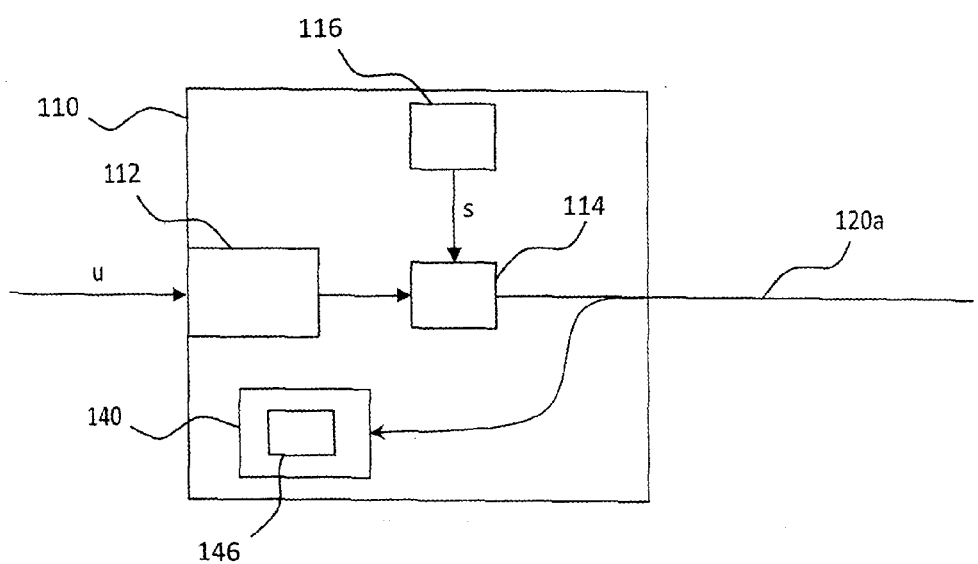

Further features, aspects and advantages of the present invention are presented in the following detailed description with reference to the drawings in which:

FIG. 1a depicts a schematic block diagram of a first embodiment of an inventive optical transmission system, FIG. 1b depicts a schematic block diagram of a second embodiment of an inventive optical transmission system, FIG. 1c depicts a schematic block diagram of a third embodiment of an inventive optical transmission system, FIG. 2 depicts a flow-chart of a first embodiment of the inventive method, FIG. 3 depicts a flow-chart of a second embodiment of the inventive method, FIG. 4 schematically depicts a discretization of an optical fiber under test using the inventive method, FIG. 5 depicts a flow-chart of a third embodiment of the inventive method, and FIG. 6 depicts a block diagram of an embodiment of an inventive optical transmitter.

DESCRIPTION OF THE EMBODIMENTS

FIG. 1a shows a first embodiment of an inventive optical transmission system 100a. The optical transmission system 100a comprises an optical transmitter 110 which is configured to transmit at least one optical data signal over an optical transmission link 120. For the present example, the optical transmission link 120 comprises a single optical fiber 120a. Generally, however, the optical transmission link 120 may also comprise a complex configuration of several optical fibers or even a complete WDM PON configuration, which e.g. comprises a tree topology or the like.

The optical fiber 120a connects said optical transmitter 110 with an optical data receiver 130 that is configured to receive said at least one optical data signal which is transmitted by said transmitter 110. Consequently, components 110, 120, 130 form a per se known optical transmission system which may e.g. be employed to transmit user data from the transmitter 110 to the data receiver 130.

To enable an efficient monitoring of said optical transmission link 120 particularly regarding fiber losses and reflections, the inventive optical transmission system 100a is configured to perform the inventive method a first embodiment of which is explained below with reference to the flow-chart of FIG. 2.

In a first step 200, said optical data signal provided by the transmitter 110 is modulated with a test signal having a predetermined modulation frequency $f_{mod}$ to obtain a modulated data signal. Consequently, the modulated data signal obtained according to the present invention comprises several spectral components: a) optical carrier frequency portions, b) user data portions, and c) modulation frequency portions.

In contrast to the optical carrier frequency portions and user data portions of the spectral components, which result from a regular data modulation for the data transmission between the components 110, 130, the spectral components of the modulation frequency portions are a result from the inventive modulation 200 with the test signal having said specific modulation frequency.

It is important to differentiate between the inventive modulation with the test signal having a specific modulation frequency and a regular modulation of an optical carrier signal for user data transmission purposes. However, since the user data transmission and related modulation schemes do not form the focus of the present invention, the term "modulation" primarily refers to the inventive modulation of an optical data signal with the inventive test signal.

As already explained above, the inventive method advantageously introduces a spectral component c) to the optical signal sent over the transmission link 120 which can be considered to be dedicated for measuring purposes since it is not part of the user data transmission and the respective spectral components a), b). Due to a specifically chosen modulation frequency, the spectral component c) may furthermore easily be separated from the other spectral components a), b) required for the regular user data transmission. Thus, the inventive method and a regular user data transmission do not exclude each other. It is rather advantageously possible to conduct the inventive step 200 of modulation with the test signal without impeding or even interrupting a regular data transmission operation between the components 110, 130.

Within the inventive transmitter 110, the modulation 200 may e.g. performed by locally generating the test signal having the predetermined modulation frequency and by adding the test signal to an existing modulation signal of the transmitter 110 which e.g. effects the conventional modulation of an optical carrier signal with a conventional modulation signal that depends on the user data to be transmitted.

For instance, it is possible to include the inventive modulation step 200 by directly modifying an electric control current for a semiconductor laser diode providing the optical signals within said transmitter 110. In this case an inventive modulation current component may be added to a conventional modulation current used for adding user data information to a carrier frequency signal during an operation of said semiconductor laser diode.

FIG. 6 shows a block diagram depicting details of an embodiment of the inventive optical transmitter 110. User data u which is to be transmitted via said optical fiber 120a is supplied to an input port 112 of the transmitter 110 in form of an electric signal such as an electric current.

The inventive transmitter 110 also comprises internal test signal generating means 116 which generate the inventive test signal s having a predetermined modulation frequency. The test signal s may also preferably be provided as an electric signal, e.g. a current.

Both the user data current u and the test signal current s are fed to electro-optic converter means 114 which may e.g. comprise a semiconductor laser device and output a modulated optical signal having both spectral components related to user data and the inventive test signal to the optical fiber 120a.

External modulation means 115 may also be employed to add the inventive modulation depending on the test signal s to a conventionally generated optical data signal, cf. the transmission system 100b of FIG. 1b. In this configuration, the transmitter 110' may comprise a conventional configuration, e.g. it does not require internal test signal generating means 116 as shown by FIG. 6.

After generating the modulated optical data signal according to step 200 of FIG. 2, said modulated optical data signal is sent from the transmitter 110 over the transmission link 120. The modulated optical data signal is symbolized by the arrow Pin, cf. FIG. 1a.

While traveling from the transmitter 110 to the user data receiver 130 via said transmission link 120, the modulated optical signal usually experiences attenuation, e.g. due to distributed losses such as fiber losses and concentrated losses that may be caused by interconnections between fiber sections (splices). Thus, a part of the optical power transmitted into the fiber 120a is reflected at splices and connectors and the like, and a further part of the optical power is backscattered in the fiber, e.g. due to Rayleigh scattering.

The reflected and backscattered power fractions of the modulated optical signal propagate in the fiber 120a back to the transmitter 110, where they superimpose incoherently, i.e. the power values of the reflected signal components are accumulated, as long as individual reflection points are separated by more than half of the coherence length of the laser 114 of said transmitter 110. For a laser line width of 1 MHz, which is a typical value for transmission lasers 114 (FIG. 6), this minimum separation is 100 meters. The minimum separation is reduced when the reflected signals experience different polarization rotation as is the case in typical transmission fibers 120a.

In order to acquire information on the transmission conditions of the transmission link 120, particularly the above explained reflection and scattering effects, the inventive method proposes a further step 210 of receiving a reflected portion of said modulated optical data signal Pin that has been supplied to the transmission link 120 by the transmitter 110.

This reflected portion is symbolized by the arrow Pback in FIG. 1a and may be received by receiver means 140, which according to the present example of FIG. 1a are integrated into the transmitter 110.

As can be seen from FIG. 1c, it is also possible to provide the transmitter 110 and the receiver 140 as separate components. In this configuration, optical power splitting means 142 have to be provided which supply the receiver 140 with the reflected portion Pback for the further inventive analysis.

From the received reflected portion Pback, a fiber quality measure can be determined at the transmitter side of the transmission system 100a, FIG. 1. I.e., in step 220, FIG. 2, the fiber quality measure is determined depending on said received reflected portion Pback of said modulated signal Pin.

Since the inventive method inter alia employs user data optical signals, which are modulated according to the present invention, it can advantageously be applied during continuous, i.e. uninterrupted, operation of the transmission system 100a. That is, for the inventive method according to the steps 200, 210, 220 to be performed properly, a conventional optical data transmission between components 110, 120, 130 is not required to be interrupted or blocked.

For example, the modulated optical data signal Pin which is transmitted over said fiber 120a according to the present invention can be described by:

$$Pin = \frac{\hat{P}}{2}\left[1 + \underbrace{\cos(2\pi f_{mod}t + \varphi_0)}_{sc1} + \underbrace{ud(t)}_{sc2}\right], \quad \text{(equation 1)}$$

wherein $\hat{P}$ denotes an optical peak power output by said transmitter 110, wherein the term $sc1 = \cos(2\pi f_{mod}t + \varphi_0)$ denotes a spectral component of said modulated optical data signal Pin which results from the inventive modulation, cf. step 200 of FIG. 2, and which consequently, inter alia, depends on the modulation frequency $f_{mod}$ of the inventive test signal s (FIG. 6). $\varphi_0$ denotes a phase shift related to the inventive modulation 200 process, and t denotes time.

The term $sc2 = ud(t)$ denotes further spectral components of the modulated optical data signal Pin that represent signal portions which are due to a conventional modulation process according to which an optical carrier frequency is modulated with said user data u, cf. FIG. 6. Since the term sc2 does not contribute to and is not required for the explanation of the inventive analysis of the received reflected portion Pback, it is not detailed any further in the following description.

According to equation (1), the inventive modulation 200 comprises using a sinusoidal modulation signal, which is a preferred embodiment of the invention.

The received reflected portion Pback can be written as:

$$Pback = \int_0^L Pin\left(t - \frac{2x}{v}\right) \cdot r(x) \cdot d^2(x)\, dx, \quad \text{(equation 2)}$$

wherein $$Pin\left(t - \frac{2x}{v}\right)$$

represents the modulated optical data signal Pin depending on the time t, a specific position x along the transmission link 120, and a speed of light v of the signal Pin within the optical fiber 120a of the transmission link 120.

FIG. 4 schematically depicts the optical fiber 120a under test together with a length coordinate x, wherein x=0 denotes the position of the transmitter 110. In case of an external modulator 115 (FIG. 1b) for the inventive modulation of step 200 (FIG. 2), the position coordinate x=0 denotes the position of the external modulator 115.

Moreover, the position coordinate x=L denotes a position of the user data receiver 130, i.e. L represents an overall length of the optical fiber 120a.

Referring back to equation (2), r(x) represents a reflection coefficient at the location x, said reflection coefficient characterising how much optical signal power is reflected back to the transmitter side 110 at said location x. For instance, if there is a splice (not shown) or some other kind of perturbation of a refractive index of the optical fiber 120a at a specific position x1, the corresponding value r(x1) of the reflection coefficient will be larger than for another position x2≠x1 having no splice or the like.

The term d(x) represents an accumulated loss between the fiber input at x=0, i.e. at the transmitter side, and a specific position x. Equation (2) comprises the squared term $d^2(x)$ since the received reflected portion Pback has traveled a fiber length of 2x prior to returning to the transmitter side and thus has suffered from attenuation effects twice, one time for each direction of travel in the fiber 120a.

The accumulated loss term d(x) may be characterized by:

$$d(x) = \exp(-\int_0^x \alpha(y)\,dy) \quad \text{(equation 3)},$$

wherein α(y) represents a location dependent attenuation term that comprises both localized losses and distributed losses (e.g., due to Rayleigh scattering) in the fiber 120a.

According to a further preferred embodiment of the invention, the reflection coefficient r(x) and the squared accumulated loss term $d^2(x)$ are combined to obtain a combined reflection and accumulated loss term $$a(x) = r(x) \cdot d^2(x) \quad \text{(equation 4)},$$

which can be interpreted as a quality measure for optical data transmission over said transmission link 120 or optical fiber 120a, respectively, because it accounts for reflection and scattering effects on the fiber 120a. Consequently, in the further description, the term "quality measure" refers to the combined reflection and accumulated loss term a(x) according to equation (4).

When combining equations (1) and (4) with equation (2), for the backward propagating optical power as received at the transmitter side, e.g. by the inventive receiver 140, it is obtained:

$$Pback = \int_0^L a(x) \cdot \frac{\hat{P}}{2}\left[1 + \cos\left(2\pi f_{mod} t + \varphi_0 - \frac{4\pi f_{mod}}{v} x\right)\right] dx. \quad \text{(equation 4a)}$$

In obtaining equation (4a), the term sc2 of equation (1) has been omitted for simplification, which in the present case is admissible as only those portions of the signal Pback are considered for the inventive determination 220 (FIG. 2) of the quality measure a(x), which comprise frequency components related to the modulation frequency $f_{mod}$ of the test signal s.

Further simplifications to equation (4a) comprise applying Euler's identity to the term sc1 of equation (1) and omitting any spectral components different from the modulation frequency used for the inventive step 200 of modulating, which yields equation (4b):

$$Pback, \text{mod} = \underbrace{\frac{\hat{P}}{4} \cdot \exp[j(2\pi f_{mod} t + \varphi_0)]}_{c1} \cdot \underbrace{\int_0^L a(x) \cdot \exp\left[-j\left(\frac{4\pi f_{mod}}{v} x\right)\right] dx}_{int1} + \text{c.c.,} \quad \text{(equation 4b)}$$

wherein "c.c." denotes the conjugate-complex term of the first summand.

From equation (4b) it can be seen that the amplitude and phase of the modulation on the backscattered/reflected power is determined by an aggregation of all scattering/reflection components, cf. the integral term int1. Consequently, for the further description, said integral term int1 is also referred to as scattering term $H(f_{mod})$:

$$H(f_{mod}) = \int_0^L a(x) \cdot \exp\left[-j\left(\frac{4\pi f_{mod}}{v} x\right)\right] dx. \quad \text{(equation 5)}$$

Both amplitude and phase of the received reflected portion Pback or the derived term Pback, mod, cf. equation (4b), are dependent on the modulation frequency $f_{mod}$.

According to a preferred embodiment of the present invention, the inventive step of receiving 210 comprises receiving the reflected portion Pback according to equation (4a) by means of said receiver 140. Since the expression c1 of equation (4b) is a constant known in the transmitter 110 (and the receiver 140), the inventive scattering term $H(f_{mod})$ can easily be derived from the received reflected portion Pback by omitting any spectral components different from the modulation frequency $f_{mod}$ used for the inventive step 200 of modulating.

I.e., the following steps may be performed in the receiver 140 to obtain the scattering term $H(f_{mod})$: measuring the signal Pback in the receiver 140, filtering the signal Pback so as to only consider spectral components having the modulation frequency $f_{mod}$, subtracting the known constant c1 from the measured signal as well as eliminating the conjugate-complex portion c.c.

The aforementioned step of filtering may also be accomplished by employing a lock-in-technique. For instance, the receiver 140 may comprise a lock-in amplifier 144 that may be tuned to the modulation frequency $f_{mod}$ which is currently used for the step of modulating 200.

This way, the scattering term $H(f_{mod})$, which usually is a complex number, is obtained by the receiver 140 or a respective control unit (not shown) that may control operation of said receiver 140 and/or said transmitter 110.

Depending on said scattering term $H(f_{mod})$, the quality measure $a(x)$ may be determined in step 220 of the inventive method.

For instance, according to one embodiment, the quality measure may directly be obtained as an absolute value of said scattering term $H(f_{mod})$, which represents a very simple quality assessment that in principle only allows to determined whether an aggregated backscattering and/or reflection is too high and that does not allow a position resolved quality assessment.

According to a further embodiment of the present invention, said steps of modulating 200 and receiving 210 are repeated for a plurality of modulation frequencies, particularly for M many different modulation frequencies $f_{mod}(m)$, m,=1, ..., M. Thus, M many different scattering terms $H(f_{mod}(m))$ are obtained, one for each modulation frequency.

According to an embodiment of the present invention, the quality measure $a(x)$ can be obtained from said M many different scattering terms $H(f_{mod}(m))$ by applying an inverse Fourier transform to these scattering terms $H(f_{mod}(m))$.

According to a further embodiment, it is also possible to discretize the total length L (FIG. 4) of said optical transmission link 120 or the fiber 120a into N many discrete length sections l1, l2, ..., lN each of which has the length δL thus enabling an efficient numeric solution with the spatial resolution of the length δL.

Based on such discretization of the fiber 120a, a discretized scattering term $H_d(f_{mod})$ may be obtained according to $$H_d(f_{mod}) = \sum_{n=1}^{N} a_n \exp\left[-j\left(\frac{4\pi f_{mod} \cdot \delta L}{v} n\right)\right],$$ (equation 6)

wherein the index variable n ranging from 1 to N denotes a discrete position, e.g. the n-th length section ln, with respect to the fiber length, and wherein $$a_n = \int_{x=(n-1)\delta L}^{n\delta L} a(x) dx$$ (equation 7).

The M many different values $f_{mod}$ chosen for the modulation frequency are likewise discrete. They can be chosen as uniformly spaced, but they can also be randomly chosen out of a frequency range limited by the practical implementation, i.e. the configuration of the test signal generating means 116, cf. FIG. 6.

Equation 6 for the discretized scattering terms $H_d(f_{mod})$ can formally be rewritten as $$\vec{H_d}(f_{mod}) = T\vec{a}$$ (equation 8), wherein $\vec{H_d}(f_{mod})$ represents a vector of discrete scattering terms M many components of which have been determined by multiple repetition of the inventive steps 200, 210 (FIG. 2) with M different modulation frequencies, wherein T represents a matrix having N many columns and M many rows, i.e. $T=[t_{m,n}]$, wherein $$t_{m,n} = \exp\left[-j\left(\frac{4\pi f_{mod}(m) \cdot \delta L}{v} n\right)\right].$$

According to the present embodiment, matrix T can be inverted to obtain the inverse matrix $T^{-1}$, and the vector a of equation (8), which comprises N many quality measure values each of which is associated with a specific length element l1, l2, ..., i.e. position of the fiber 120a, may be obtained by a matrix multiplication of $T^{-1}$ and the vector $\vec{H_d}(f_{mod})$:

$$T^{-1}\vec{H_d}(f_{mod}) = T^{-1}T\vec{a} = \vec{a}$$ (equation 8a).

For this embodiment of the inventive method, matrix T has to be a square matrix, i.e. it is recommendable to provide the same number M of different modulation frequencies as there are length sections l1, l2, ..., i.e. M=N.

According to a further embodiment of the present invention, which is particularly preferred due to its simplicity and precision, scattering terms $H(f_{mod})$ are determined for M many different modulation frequencies $f_{mod}(m)$, m=1, ..., M, wherein each scattering term $H(f_{mod})$ characterizes an amplitude and phase of said reflected portion Pback at a specific modulation frequency $f_{mod}$.

Said determination of said scattering terms may e.g. be performed by repeatedly conducting the inventive steps of modulating 200 (FIG. 2) and receiving 210 for M many times thus obtaining M many reflected portions Pback, wherein every reflected portion has been obtained for a different modulation frequency. The M many reflected portions Pback may e.g. measured by using an opto-electric converter such as a photo diode or the like.

From the M many reflected portions Pback, which have been measured by the receiver 140 in the course of the receiving step 210, the scattering terms $H(f_{mod})$ can be easily obtained as disclosed above with reference to equations (4a), (4b), (5), i.e. by neglecting frequency components other than the respective modulation frequency and by eliminating conjugate-complex portions of said reflected portions Pback.

The determination of said M many scattering terms according to the present embodiment of the invention is symbolized by step 300 of the flow-chart depicted by FIG. 3.

In a further step 310 of the current embodiment, each scattering term $H(f_{mod})$ associated with a specific modulation frequency $f_{mod}$ is multiplied with a phase term denoting a phase shift which depends on said modulation frequency $f_{mod}$ and a specific position x0 on said optical transmission link 120, whereby for each modulation frequency $f_{mod}$ a phase-shifted scattering term $Hp(f_{mod})$ is obtained:

$$Hp(f_{mod}) = H(f_{mod}) \cdot pt(m,x0)$$ (equation 9).

After that, in step 320, a sum $$sHP = \sum_{m=1}^{M} Hp(f_{mod}(m)) = \sum_{m=1}^{M} H(f_{mod}(m)) \cdot pt(m,x0),$$ (equation 10), of all M many phase-shifted scattering terms $Hp(f_{mod})$ is determined, and finally, in step 330, the value for said quality measure $a(x0)$ at said specific position is determined depending on said sum obtained in step 320, preferably by dividing said sum by said number M of different modulation frequencies $f_{mod}$:

$$a(x0) = sHP/M$$ (equation 11).

According to Applicant's analysis, the obtained quotient $a(x0)$ precisely reflects the state of the optical transmission link 120 at the position x=x0 as far as reflection and scattering effects are concerned.

The inventive determination of said quotient according to the steps 310, 320, 330 can be performed by using calculation means 146 (FIG. 6) such as a microprocessor or a digital signal processor (DSP) which may be integrated in the optical transmitter 110 or optical receiver 140.

According to a particularly preferred variant of the afore explained embodiment of the present invention, each scattering term $H(f_{mod})$ is preferably obtained depending on the equation $$H(f_{mod}) = \int_0^L a(x) \cdot \exp\left[-j\left(\frac{4\pi f_{mod}}{v}x\right)\right] dx, \quad \text{(equation 12)}$$

wherein $f_{mod}$ denotes said specific modulation frequency, dx denotes a differential length element of a specific position x on said optical transmission link (120), L denotes a total length of said optical transmission link 120 to be analyzed, a(x) denotes the spatial reflection function which characterises reflection effects and/or scattering effects and/or losses of said optical transmission link 120 associated with said specific position x, exp [•] denotes the exponential function, j denotes the imaginary unit, and v denotes the speed of light within said optical transmission link 120.

According to a particularly preferred variant of the afore explained embodiment of the present invention, each phase term pt(m) is preferably obtained depending on the equation $$pt(m) = \exp\left[j\left(\frac{4\pi f_{mod}(m)}{v}x0\right)\right]. \quad \text{(equation 13)}$$

Consequently, when combining equations (12) and (13), the inventive phase-shifted scattering term $Hp(f_{mod})$ can preferably be obtained depending on the equation $$Hp(f_{mod}) = H(f_{mod}) \cdot pt(m) \quad \text{(equation 14)}$$

$$= \int_0^L a(x) \cdot \exp\left[-j\left(\frac{4\pi f_{mod}(m)}{v}x\right)\right] dx \cdot$$

$$\exp\left[j\left(\frac{4\pi f_{mod}(m)}{v}x0\right)\right].$$

According to a further preferred embodiment of the inventive method, a particularly simple and efficient numerical solution to equation (14) can obtained if the total length L of said optical transmission link 120 to be analyzed is discretized into N many discrete length sections l1, l2, . . . , lN each of which has the length δL, and when said phase term pt(m) is discretized so as to obtain a discretized phase term ptd(m) which depends on a specific position x0=n0·δL corresponding to one of said discrete length sections l1, l2, . . . , lN.

Said discretized phase term ptd(m) is preferably obtained depending on the equation $$pt_d(m, x0 = n0 \cdot \delta L) = \exp\left[j\left(\frac{4\pi f_{mod}(m)}{v}n0 \cdot \delta L\right)\right]. \quad \text{(equation 15)}$$

Applying said discretization of the phase term pt(m) to equation (10) and using the discretized form for the scattering terms $H_d(f_{mod})$ according to equation (6) yields:

$$sHP = \Sigma_{m=1}^M H_d(f_{mod}) \cdot pt_d(m) \quad \text{(equation 16)}$$

which can be simplified as follows:

(equation 17)

$$\sum_{m=1}^M H_d(f_{mod}) \cdot pt_d(m) = \sum_{m=1}^M \left[\frac{\left(\sum_{n=1}^N a_n \exp\left[-j\left(\frac{4\pi f_{mod}(m) \cdot \delta L}{v}n\right)\right]\right) \cdot}{\underbrace{H_d(f_{mod}(m))}} \cdot \frac{\exp\left[j\left(\frac{4\pi f_{mod}(m)}{v}n0 \cdot \delta L\right)\right]}{\underbrace{pt_d(m)}}\right]$$

$$= \sum_{m=1}^M \left[\left(\sum_{n=1}^N a_n \exp\left[-j\left(\frac{4\pi f_{mod}(m) \cdot \delta L}{v}(n - n0)\right)\right]\right)\right]$$

$$= \sum_{m=1}^M \underbrace{\left[\sum_{n=1}^{N, n \neq n0} a_n \exp\left[-j\left(\frac{4\pi f_{mod}(m) \cdot \delta L}{v}\left(\frac{n-}{n0}\right)\right)\right]\right]}_{s1} +$$

$$\sum_{m=1}^M a_{n0}.$$

The left hand summand s1 in the last line of equation (17) approaches zero, if a sufficient large number M of modulation frequencies is considered, thus, it follows:

$$sHP \approx M \cdot a_{n0}$$

Hence, for the quality measure $a_{n0}$ at the position n0 it is obtained:

$$a_{n0} = sHP/M \quad \text{(equation 18)}.$$

This procedure may advantageously be repeated for all length sections l1, l2, . . . of the transmission link 120 or the fiber 120a, respectively, to get information on the state of the whole fiber 120a.

For instance, in order to determine the quality measure a1 for the first length section l1, the variable n0 is chosen to be 1, and so on. This way, discrete quality measure values $a_1, \ldots, a_N$ may be obtained for all of the N many length sections l1, . . . , lN.

According to a further variant of the present invention, it is also possible to determine a location $n_{max}$ of a length section which is associated with a maximum quality measure value $a_{max}(n_{max})$ that has the largest absolute value of said N many values $a_1, \ldots, a_N$ of said quality measure. Since this length section at the location $n_{max}$ makes the largest contribution to reflection and scattering effects of the whole fiber under test 120a, its exact position $n_{max}$ is of great interest for planning a further analysis or inspection of the transmission link 120.

As numerical simulations revealed, the aforedescribed method of determining the quality measure values $a_n$ yields particularly precise results if the differences between the various quality measure values $a_n$ are comparatively small, i.e. if they only have a small variance.

According to another preferred embodiment of the inventive method, the precision of the quality measure values $a_n$ can be improved by taking into consideration the influence of the left hand summand s1 in the last line of equation (17). This is particularly useful for such configurations where only a comparatively small number M of different modulation frequencies is used.

It is therefore proposed to reduce the impact of a large localized backscattering parameter, i.e. quality measure value $a_{n1}$, of a specific length section before calculating the quality measure values $a_n$, $n \neq n1$ for other length sections. For this purpose, the following method steps are proposed:

First of all, in step 400 of the flow-chart depicted in FIG. 5, the inventive steps of modulating 200 (FIG. 2) and receiving 210 are repeated using a predetermined number M of different modulation frequencies.

As a second step 410, M many scattering terms $H(f_{mod}(m))$ for all used modulation frequencies are determined as already explained above, cf. e.g. equations (4a), (4b), (5), i.e. by measuring Pback at the receiver 140, by neglecting frequency components other than the respective modulation frequency and by eliminating conjugate-complex portions of said received reflected portions Pback. Furthermore, in step 410, the quality measure values $a_1, \ldots, a_N$ are also determined as explained above, i.e. by repeatedly applying equations (16), (17) to different length sections of the fiber 120a. Still in step 410 of FIG. 5, the maximum quality measure value $a_{max}$ ($n_{max}$) is determined:

$$a_{max} = \max(abs(a_n)); n=1, \ldots N,$$

i.e. to determine the overall maximum quality measure value, preferably an absolute value abs( ) of the respective quality measure values is used.

After that, in step 420, all of the M many scattering terms $H(f_{mod}(m))$ are modified depending on said maximum quality measure value $a_{max}$ to obtain respective modified scattering terms $H'(f_{mod}(m))$. The modification is preferably performed by subtracting from a scattering term $H(f_{mod}(m))$ a product of an absolute value $abs(a_{max})$ of said maximum quality measure value $a_{max}$ and an associated phase term which characterizes a phase shift that is associated with said location $n_{max}$ of said length section which is associated with said maximum quality measure value $a_{max}$.

Said modifying 420 is particularly performed depending on the equation:

$$H'(f_{mod}(m)) = \quad \text{(equation 19)}$$
$$H(f_{mod}(m)) - abs(a_{max}) \cdot \exp\left[-j\left(\frac{4\pi f_{mod}(m)}{v} n_{max} \cdot \delta L\right)\right].$$

The step 420 of modifying ensures that the impact of the maximum quality measure value $a_{max}$ of the whole fiber 120a is compensated.

Based on the modified scattering terms $H'(f_{mod}(m))$ obtained in step 420, in step 430 modified values $a'(n)$ are determined for all N many discrete length sections except said length section which is associated with said maximum quality measure value $a_{max}(n_{max})$. This is achieved by repeating said steps of multiplying 310, determining 320 the sum sHP and determining 330 the value for said quality measure a based on said modified scattering terms $H'(f_{mod})$.

I.e., the already above disclosed method steps 310, 320, 330 are performed based on the modified scattering terms $H'(f_{mod})$ rather than the unmodified scattering terms $H(f_{mod})$.

Consequently, after a first application of said step 430, (N−1) many modified quality measure values are obtained, i.e. for those (N−1) many length sections l1, . . . of the fiber 120a which are not associated with the maximum quality measure value $a_{max}(n_{max})$.

These (N−1) many modified quality measure values have advantageously been determined without the influence of the maximum quality measure value $a_{max}(n_{max})$, the impact of which has been removed by application of equation (19). Thus, the modified quality measure values comprise a higher precision as their corresponding unmodified values.

After said (N−1) many modified quality measure values have been determined, from these modified quality measure values a maximum value may be determined, and the procedure may recursively be continued, step 440, for N many times to obtain precise quality measure values for all length sections of the fiber 120a.

At the start of the second cycle, the modified scattering terms $H'(f_{mod})$, that have been modified in the previous cycle, are further modified by applying equation (19) based on the (N−1) many modified quality measure values and their current maximum value. Subsequently, said further modified scattering terms can be used to calculate a new set of (N−2) many quality measure values, and so on.

After N many recursions, the backscattering parameters, i.e. quality measure values an for all length sections have been obtained. To further reduce errors, it is possible to calculate an absolute value of the quality measure values an.

Of course, it is also possible to perform the recursions of step 440 for a smaller number of cycles as compared to the overall number of length sections, e.g. only until a variance of the currently remaining quality measure values has not reached a predetermined lower threshold value.

According to a further advantageous embodiment of the inventive method, a frequency spacing δf for adjacent modulation frequencies $f_{mod}(m=1), f_{mod}(m=2), \ldots$ is chosen which is proportional to a reciprocal value of the number M of different modulation frequencies and/or the length δL of the N many discrete length sections, wherein said frequency spacing δf is particularly obtained depending on the equation $$\delta f = \frac{P \cdot v}{2M \cdot \delta L}, \quad \text{(equation 20)}$$

wherein P is an integer.

For a spatial resolution of δL=100 meters, the frequency range M·δf should be chosen to be a multiple of 1 MHz. In addition, if this condition is not exactly met, the base frequency $f_{mod}(m=1)$ should satisfy the equation $$f_{mod}(m=1) \neq \frac{P \cdot v}{2\delta L}.$$

The inventive method advantageously requires a less complex hardware setup as compared to conventional OTDR and OFDR systems because a regular optical data signal carrying user traffic is employed for performing the inventive method. Moreover, performing the inventive method does not require any interruption of a regular operation of the optical transmission system 100a, 100b, 100c, because it is the regular optical data signal which is modulated for test purposes according to the principle of the present invention.

The inventive method advantageously enables to efficiently monitor physical properties such as loss and/or reflection parameters a of a fiber plant or a single optical transmission link 120 while the respective optical transmission systems 100a, 100b, 100c remain fully operative.

The inventive steps related to receiving 210 (FIG. 2) the reflected portion Pback and determining 220 the quality measure—as well as the further method steps explained with respect to FIG. 3 and FIG. 5—are advantageously performed by calculation means 146 such as a DSP which may be integrated into the inventive receiver 140.

A further aspect of the present invention is given by a computer program product that comprises computer-readable instructions that—when executed by the computer—cause the computer to perform the method according to the present invention.

The invention claimed is:

1. Method of operating an optical transmission system, wherein at least one optical data signal is transmitted over an optical transmission link, which particularly comprises at least one optical fiber, comprising steps:
  modulating said data signal with a test signal (s) having a predetermined modulation frequency $f_{mod}$ to obtain a modulated data signal
  receiving a reflected portion of said modulated data signal; and
  determining a fiber quality measure depending on said received reflected portion of said modulated signal;
  wherein, for said step of determining said fiber quality measure, a frequency component of said received reflected portion of said modulated signal is determined which corresponds to said predetermined modulation frequency, and wherein the frequency component is a scattering term $H(f_{mod})$ derived from said predetermined modulation frequency;
  a plurality of scattering terms $H(f_{mod})$ are determined for many (M) modulation frequencies $f_{mod}(m), m=1,\ldots,M$, wherein each scattering term $H(f_{mod})$ characterizes an amplitude and phase of said reflected portion at a specific modulation frequency $f_{mod}$;
  each scattering term $H(f_{mod})$ associated with a specific modulation frequency $f_{mod}$ is multiplied with a phase term denoting a phase shift which depends on said modulation frequency $f_{mod}$ and a specific position x0 on said optical transmission link, whereby for each modulation frequency $f_{mod}$ a phase-shifted scattering term $Hp(f_{mod})$ is obtained;
  a sum of all M many phase-shifted scattering terms $Hp(f_{mod})$ is determined; and
  the value for said quality measure at said specific position is determined depending on said sum.

2. Method according to claim 1, wherein said step of modulating is performed by altering an input signal of a wavelength division multiplex (WDM) transmitter depending on said test signal.

3. Method according to claim 1, wherein said step of modulating is performed by using an external modulator.

4. Method according to claim 1, wherein a plurality of different optical data signals of a wavelength division multiplex, WDM, system are modulated by respective test signals.

5. Method according to one claim 1, wherein said steps of modulating and receiving are repeated for M many different modulation frequencies $f_{mod}(m), m=1,\ldots,M$.

6. Method according to claim 1, wherein
  each scattering term $H(f_{mod})$ is obtained depending on the equation $$H(f_{mod}) = \int_0^L a(x) \cdot \exp\left[-j\left(\frac{4\pi f_{mod}}{v}x\right)\right] dx,$$

wherein $f_{mod}$ denotes said specific modulation frequency, dx denotes a differential length element of a specific position x on said optical transmission link (120), L denotes a total length of said optical transmission link to be analyzed, a(x) denotes a spatial reflection function which characterises reflection effects and/or scattering effects and/or losses of said optical transmission link associated with said specific position x, exp [•] denotes the exponential function, j denotes the imaginary unit, and v denotes the speed of light within said optical transmission link,
  each phase term (pt(m)) is obtained depending on the equation $$pt(m) = \exp\left[j\left(\frac{4\pi f_{mod}(m)}{v}x0\right)\right]$$

each phase-shifted scattering term $Hp(f_{mod})$ is obtained depending on the equation $$Hp(f_{mod}) = H(f_{mod}) \cdot pt(m)$$
$$= \int_0^L a(x) \cdot \exp\left[-j\left(\frac{4\pi f_{mod}(m)}{v}x\right)\right] dx \cdot \exp\left[j\left(\frac{4\pi f_{mod}(m)}{v}x0\right)\right].$$

7. Method according to claim 1, wherein a total length L of said optical transmission link to be analyzed is discretized into N many discrete length sections each of which has the length $\delta L$, and wherein said phase term pt(m) is discretized so as to obtain a discretized phase term ptd(m) which depends on a specific position $n \cdot \delta L$ corresponding to one of said discrete length sections, wherein said discretized phase term ptd(m) is preferably obtained depending on the equation $$ptd(m, n \cdot \delta L) = \exp\left[j\left(\frac{4\pi f_{mod}(m)}{v} n \cdot \delta L\right)\right].$$

8. Method according to one claim 7, wherein a value a(n), $n=1,\ldots,N$ for said quality measure is determined for all N many discrete length sections.

9. Method according to claim 8, wherein a location $n_{max}$ of a length section is determined which is associated with a maximum quality measure value $a_{max}(n_{max})$ that has the largest absolute value of said N many values a(n), $n=1,\ldots,N$ of said quality measure.

10. Method according to claim 9, comprising the steps of:
  modifying all M many scattering terms $H(f_{mod}(m))$ depending on said maximum quality measure value $a_{max}$ to obtain respective modified scattering terms $H'(f_{mod}(m))$, wherein said modifying is preferably performed by subtracting from a scattering term $H(f_{mod}(m))$ a product of an absolute value $abs(a_{max})$ of said maximum quality measure value $a_{max}$ and an associated phase term which characterizes a phase shift that is associated with said location $n_{max}$ of said length section which is associated with said maximum quality measure value $a_{max}$, wherein said modifying is particularly performed depending on the equation $$H'(f_{mod}(m)) = H(f_{mod}(m)) - abs(a_{max}) \cdot \exp\left[-j\left(\frac{4\pi f_{mod}(m)}{v} n_{max} \cdot \delta L\right)\right]$$

determining modified values a'(n) for all N many discrete length sections except said length section which is associated with said maximum quality measure value $a_{max}$ ($n_{max}$) by repeating said steps of multiplying, determining the sum and determining the value for said quality measure based on said modified scattering terms $H'(f_{mod})$.

11. (Previously presented Method according to claim 10, characterized by recursively repeating the step of determining modified values a'(n).

12. Method according to claim 7, wherein a frequency spacing δf for adjacent modulation frequencies $f_{mod}(m=1)$, fmod(m=2), . . . is chosen which is proportional to a reciprocal value of the number M of different modulation frequencies and/or the length δL of the N many discrete length sections, wherein said frequency spacing δf is particularly obtained depending on the equation $$\delta f = \frac{P \cdot v}{2M \cdot \delta L},$$

wherein P is an integer.

13. Optical receiver configured to receive a reflected portion of a modulated data signal that has been transmitted over an optical transmission link, which particularly comprises at least one optical fiber, wherein said optical receiver is further configured to determine a fiber quality measure depending on said received reflected portion of said modulated signal, and further configured to:

receive a plurality of reflected portions of modulated data signals each of which has been modulated with one of M many different modulation frequencies $f_{mod}(m)$, m= 1, . . . , M;

determine a scattering term $H(f_{mod}(m))$ for each of said M many different modulation frequencies, wherein each scattering term $H(f_{mod}(m))$ characterizes an amplitude and phase of said reflected portion at a specific modulation frequency $f_{mod}(m)$;

multiply each scattering term $H(f_{mod}(m))$ associated with a specific modulation frequency $f_{mod}(m)$ with a phase term (pt(m)) denoting a phase shift which depends on said modulation frequency $f_{mod}(m)$ and a specific position x0 on said optical transmission link, whereby for each modulation frequency $f_{mod}(m)$ a phase-shifted scattering term $Hp(f_{mod})$ is obtained;

determine a sum of all M many phase-shifted scattering terms $Hp(f_{mod})$; and determine the value for said quality measure at said specific position depending on said sum.

14. Optical receiver according to claim 13 characterized in that said receiver is configured to perform a method of determining fiber quality measure a frequency component of said received reflected portion of said modulated signal is determined which corresponds to a predetermined modulation frequency $f_{mod}$.

15. Optical transmission system comprising an optical transmission link, which particularly comprises at least one optical fiber, an optical transmitter configured to transmit at least one optical data signal over an optical transmission link, which particularly comprises at least one optical fiber, characterized in that said transmitter is configured to modulate said data signal with a test signal (s) having a predetermined modulation frequency $f_{mod}$ to obtain a modulated data signal for transmission over said optical transmission link, and an optical receiver according to claim 13.

* * * * *